United States Patent Office 3,450,770
Patented June 17, 1969

3,450,770
POLYPHENYL THIOETHERS
John Robert Campbell, Creve Coeur, and Roger E. Hatton, Kirkwood, Mo., assignors to Monsanto Company, a corporation of Delaware
No Drawing. Continuation-in-part of application Ser. No. 253,253, Jan. 23, 1963. This application Feb. 27, 1963, Ser. No. 261,470
Int. Cl. C07c 149/30
U.S. Cl. 260—609        5 Claims This application is a continuation in part of application Ser. No. 253,253, filed Jan. 23, 1963, and now abandoned, and a continuation in part of application Ser. No. 225,869, filed Sept. 24, 1962, which issued as U.S. Patent No. 3,119,877; which in turn is a continuation in part of application Ser. No. 202,956, filed June 18, 1962; which in turn is a continuation in part of application Ser. No. 161,422, filed Dec. 22, 1961; application Ser. No. 69,559, filed Nov. 16, 1960; application Ser. No. 69,574, filed Nov. 16, 1960; and application Ser. No. 69,575, filed Nov. 16, 1960, all of which are now abandoned.

This invention relates to new meta-linked polyphenyl thioethers and to the use of polyphenyl thioethers and phenylmercaptobiphenyls as oxidation stabilizers in polyphenyl ethers and phenoxybiphenyls.

Although functional fluids have long been known and widely used, the functional fluids of today are used under a wide variety of conditions which impose a severe restriction upon their physical and chemical properties. Thus, today, functional fluids are used as synthetic lubricants for gas-turbine engines, as hydraulic fluids for supersonic aircraft and missiles, as coolants for electronic equipment, etc., and in such uses are required to function at temperatures from below 0° F. up to temperatures of 500° F. or higher. The requirement of such a wide liquid range poses the very difficult problem of finding materials which are thermally stable at very high temperatures, but are still fluid at low temperatures. In addition, such materials, or fluids, must also possess at least adequate temperature-viscosity properties and suitable lubricity; i.e., the fluids must not get too thin at the very high temperatures nor too thick at the low temperatures, and must be able to provide minimal lubrication over the range of temperatures at which they are used.

Many materials have been proposed for use as lubricants but for the most part each of them inherently possesses one or more shortcomings making their use undesirable in that respect. For example, the silicone fluids are extremely stable at high temperature but are notorious for their poor lubricating properties. Ester lubricants on the other hand are excellent where low operating temperatures are concerned due to their low pour points and high viscosity indices, but they do not have satisfactory thermal or oxidative stability at temperatures of the order of 400° F. and above. Mineral lubricating oils which exhibit satisfactory low-temperature viscosities have generally been found to have flash points that are dangerously low and high-temperature viscosities that are below those required. It has also been found that in general, additives do not enhance these essential properties to a satisfactory extent.

One of the most important properties that any lubricant must possess in addition to those normally associated with lubrication, such as a suitable viscosity and sufficient lubricity, is a combination of high temperature stability and oxidation stability. The latter property constitutes a basic and essential attribute which can be satisfied in one of two ways and preferably a combination of both, which are an inherent stability against degradation due to oxidation and the ability of the lubricant to respond to stabilization against oxidation in the presence of additive materials. At temperatures up to about 400° F., the stabilization of organic materials is not regarded as being especially difficult since many compounds are known and available which will provide the needed stability. However, as temperatures are raised, such as in the operation of gas-turbine engines, there is a drastic change in the course of oxidation and the ability of known compounds to prevent oxidation of organic materials rapidly decreases. In fact, the rate of oxidation accelerates rapidly as temperatures are raised and many compounds which normally provide oxidation stabilization at lower temperatures reverse their roles at elevated temperatures and become pro-oxidants.

Recent studies in the synthetic lubricant field have indicated that polyphenyl ethers have excellent thermal stability and possess sufficient oxidation resistance as an inherent characteristic to allow their use at extremely high operating temperatures. Unfortunately, however, even these stable materials are of limited utility when the temperatures exceed about 550° F. for long periods of time. Another disadvantage of the polyphenyl ethers is that their melting points are high so that the liquid range or range of useful operation is hampered. Another class of compounds, the poly(phenoxy)biphenyls, possess lower melting points than the polyphenyl ethers, and are, therefore, useful for lower temperature applications.

It has now been found that (1) certain all meta-linked polyphenyl thioethers inherently possess the requirements mentioned above making them outstanding materials for use as high-temperature hydraulic fluids, lubricants, heat, transfer fluids, and the like, having a wide liquid range and that (2) polyphenyl thioethers and phenylmercaptobiphenyls can be used as additives for the polyphenyl ethers and phenoxybiphenyls to improve the oxidation stability thereof. Among the all meta-linked polyphenyl thioethers of this invention, m-bis(phenylmercapto)benzene is outstanding, as will be hereinafter evident.

The all meta-linked polyphenyl thioethers of this invention can be represented by the structure

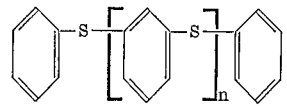

where $n$ is a whole number from 1 to 3. Thus, the all meta-inked polyphenyl thioethers are:

m-Bis(phenylmercapto)benzene
Bis(m-phenylmercaptophenyl)sulfide
m-Bis(m-phenylmercaptophenylmercapto)benzene The term "polyphenyl thioether" means a compound or physical or isomeric mixture of compounds represented by the structure (1)
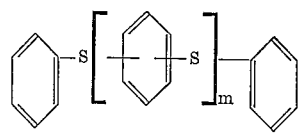

where $m$ is a whole number from 1 to 3, and (2)
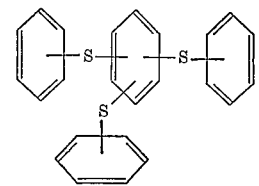

The phenylmercaptobiphenyls can be represented by the structure

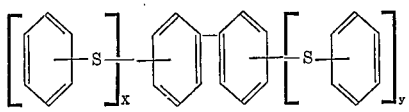

where $x$ and $y$ are whole numbers from 0 to 3 and the sum of $x+y$ is from 1 to 6.

Typical examples of polyphenyl thioethers in addition to the all meta-linked polyphenyl thioethers and phenylmercaptobiphenyls are:

THREE AROMATIC RINGS o-Bis(phenylmercapto)benzene
p-Bis(phenylmercapto)benzene
Phenylmercaptobiphenyl

FOUR AROMATIC RINGS

Bis(o-phenylmercaptophenyl)sulfide
Bis(p-phenylmercaptophenyl)sulfide
o-Phenylmercapto-m-phenylmercaptodiphenyl sulfide
p-Phenylmercapto-m-phenylmercaptodiphenyl sulfide
1,2,3-tris(phenylmercapto)benzene
1,2,4-tris(phenylmercapto)benzene
1,3,5-tris(phenylmercapto)benzene
2,2'-bis(phenylmercapto)biphenyl
4,4'-bis(phenylmercapto)biphenyl

FIVE AROMATIC RINGS o-Bis(o-phenylmercaptophenylmercapto)benzene
p-Bis(p-phenylmercaptophenylmercapto)benzene
p-Bis(o-phenylmercaptophenylmercapto)benzene
p-Bis(m-phenylmercaptophenylmercapto)benzene
m-Bis(p-phenylmercaptophenylmercapto)benzene
o-Bis(p-phenylmercaptophenylmercapto)benzene
ar-Bis(phenylmercapto)-ar'-(phenylmercapto)benzene
2,2',4-tris(phenylmercapto)biphenyl

MORE THAN FIVE AROMATIC RINGS 2,2',4,4'-tetra(phenylmercapto)biphenyl
2,2',3,3',4,4',-hexa(phenylmercapto)biphenyl As used herein "polyphenyl ether" means a compound or physical or isomeric mixture of compounds represented by the structure

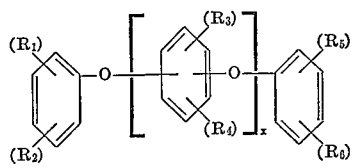

where $R_1$, $R_2$, $R_3$, $R_4$, $R_5$ and $R_6$ can be hydrogen; alkyl; e.g., methyl, isopropyl, butyl, tert,-butyl, amyl. tert.-amyl, etc.; alkoxy, phenyl; alkylphenyl; cycloalkyl; trifluoromethyl; halogen; hydroxy; and alpha-cumyl and $x$ is a whole number from 1 to 6.

Typical examples of polyphenyl ethers and phenoxybiphenyls are:

THREE AROMATIC RINGS m-Diphenoxybenzene
o-Diphenoxybenzene
p-Diphenoxybenzene
1-(p-methylphenoxy)-4-phenoxybenzene
1-(m-methylphenoxy)-4-phenoxybenzene
1-(o-methylphenoxy)-4-phenoxybenzene
p-Bis(p-methylphenoxy)benzene
p-Bis(m-methylphenoxy)benzene
p-Bis(o-methylphenoxy)benzene
p-Bis(3,5-dimethylphenoxy)benzene
p-Bis(p-ethylphenoxy)benzene
p-Bis(p-n-propylphenoxy)benzene
1-(2-methyl-5-isopropylphenoxy)-4-phenoxybenzene
p-Bis(p-isopropylphenoxy)benzene
p-Bis(2-methyl-5-isopropylphenoxy)benzene
p-Bis(p-chlorophenoxy)benzene
p-Bis(p-bromophenoxy)benzene
p-Bis(p-hydroxyphenoxy)benzene
2,4-diphenoxy-1-methylbenzene
2,4-bis(3-methylphenoxy)-1-methylbenzene
2,4-bis(3,4-dimethylphenoxy)-1-methylbenzene
2,4-bis(3-methylphenoxy)-1-ethylbenzene
2,4-bis(3-methyl-5-ethylphenoxy)-1-methylbenzene
2,4-bis(4-n-propylphenoxy)-1-methylbenzene
p-Bis(p-methoxyphenoxy)benzene
p-Bis(m-trifluoromethylphenoxy)benzene
1-(p-tert-butylphenoxy)-4-phenoxybenzene
p-Bis(p-tert-butylphenoxy)benzene
1-(2,4-di-sec-amylphenoxy)-4-phenoxybenzene
p-Bis(p-n-octylphenoxy)benzene
1-(p-cyclohexylphenoxy)-4-phenoxybenzene
1-(o-cyclohexylphenoxy)-4-phenoxybenzene
p-Bis(p-cyclopentylphenoxy)benzene
Phenoxybiphenyl

FOUR AROMATIC RINGS

Bis(m-phenoxyphenyl)ether
Bis(o-phenoxyphenyl)ether
Bis(p-phenoxyphenyl)ether
m-Phenoxyphenyl p-phenoxyphenyl ether
m-Phenoxyphenyl o-phenoxyphenyl ether
p-Phenoxyphenyl o-phenoxyphenyl ether
Bis(mix-phenoxyl)ether (isomer mixture)
Bis[p-(m-methoxyphenoxy)phenyl]ether
Bis[p-(p-methoxyphenoxy)phenyl]ether
Bis[p-(m-trifluoromethylphenoxy)phenyl]ether
Bis[p-(p-bromophenoxy)phenyl]ether
1-(p-alpha-cumylphenoxy)-4-phenoxybenzene
1-(o-phenylphenoxy)-4-phenoxybenzene
Bis[p-(p-methylphenoxy)phenyl]ether
Bis[p-(m-methylphenoxy)phenyl]ether
Bis[p-(o-methylphenoxy)phenyl]ether
Bis[p-(p-ethylphenoxy)phenyl]ether
Bis[p-(p-tert-butylphenoxy)phenyl]ether
Bis[p-(p-tert-amylphenoxy)phenyl]ether
Bis[p-(2-phenyl-4-tert-butylphenoxy)phenyl]ether
2,2'-bis(phenoxy)biphenyl
4,4'-bis(phenoxy)biphenyl

FIVE AROMATIC RINGS m-Bis(m-phenoxyphenoxy)benzene
o-Bis(o-phenoxyphenoxy)benzene
p-Bis(p-phenoxyphenoxy)benzene
m-Bis(p-phenoxyphenoxy)benzene
o-Bis(m-phenoxyphenoxy)benzene
m-Bis(o-phenoxyphenoxy)benzene
p-Bis(o-phenoxyphenoxy)benzene
mix-bis(phenoxyphenoxy)benzene (isomer mixture)
p-Bis(m-phenoxyphenoxy)benzene
m-Bis(p-alpha-cumylphenoxy)benzene
p-Bis[p-(p-methylphenoxy)phenoxy]benzene
2,2',4-tris(phenoxy)biphenyl

SIX AROMATIC RINGS

Bis[m-(m-phenoxyphenoxy)phenyl]ether
Bis[p-(p-phenoxyphenoxy)phenyl]ether
Bis[p-(m-phenoxyphenoxy)phenyl]ether
p-Bis[p-(p-(p-methylphenoxy)phenoxy)phenyl]ether
Bis[p-(p-alpha-cumylphenoxy)phenyl]ether
Bis[p-(p-phenoxyphenoxy)phenoxy)phenyl]ether
2,2',4,4'-tetra(phenoxy)biphenyl

SEVEN AROMATIC RINGS m-Bis[m-(m-phenoxyphenoxy)phenoxy]benzene
m-Bis[m-(p-phenoxyphenoxy)phenoxy]benzene

EIGHT AROMATIC RINGS

Bis[p-(p-(p-phenoxyphenoxy)phenoxy)phenyl]ether
2,2',3,3',4,4'-hexa(phenoxy)biphenyl The prepartion of polyphenyl thioethers and phenylmercaptobiphenyls is illustarted in the following exampes, wherein "parts" are parts by weight unless otherwise stated.

THREE AROMATIC RINGS

The three ring polyphenyl thioethers can be prepared by reacting an alkali metal salt of thiophenol with a dihalobenzene in dimethylacetamide or other suitable solvent, as illustrated below.

Example 1

Into a suitable reaction vessel fitted with conventional accessories, there were charged 19.6 parts of 86% potassium hydroxide, 33 parts of thiophenol, and 120 ml. of dimethylacetamide. The resulting mixture was heated, with agitation, to remove all the water present, leaving a solution of potassium thiophenolate in dimethylacetamide. To this mixture there were then charged 26.3 parts of m-dibromobenzene, and the resulting mixture was heated to and maintained at reflux, with agitation, for about 6 hours. Thereafter water was added, resulting in the formation of an aqueous and an organic layer. The organic layer was separated, washed with water, and dried under vacuum to leave a residue which, upon fractionation, gave 32.5 parts of a light yellow oil, m-bis(phenylmercapto)benzene, which had a boiling point of 174–181° C. at 0.3 mm. and an index of refraction, $n_D^{25°}$, of 1.6742.

FOUR AROMATIC RINGS

The four ring polyphenyl thioethers can be prepared by reacting an alkali metal salt of a phenylmercaptobenzenethiol with a halophenyl phenyl sulfide in dimethylacetamide or other suitable solvent, as illustrated below.

Example 2

Into a suitable reaction vessel containing a Grignard reagent of 63.4 parts of m-chlorophenyl phenyl sulfide in tetrahydrofuran, there were charged 9.2 parts of sulfur. The resulting mixture was kept below 35° C. with an ice bath while stirring for about 5 minutes. Thereafter the reaction mixture was treated with dilute acid and was extracted with ether, and the ether-soluble material was washed, dried and fractionated to give m-mercaptophenyl phenyl sulfide, a colorless liquid, B.P. 127–138° C./0.35 mm.; $n_D^{25°}$ of 1.6705.

The potassium salt of 61.2 parts of m-mercaptophenyl phenyl sulfide was prepared and dissolved in dimethylacetamide, 50 parts of m-chlorophenyl phenyl sulfide were then added and the resulting mixture heated for 1½ days at about 150° C. The reaction mixture was then treated in the manner of Example 1 to provide bis(m-phenylmercaptophenyl)sulfide, a yellow liquid, B.P. 252–265° C./0.25 mm.

Example 3

Into a suitable reaction vessel there were charged 72.5 parts of 85% potassium hydroxide, 121 parts of thiophenol and 500 ml. of dimethylacetamide. The resulting mixture was heated, with agitation, to remove the water present, leaving a solution of potassium thiophenolate in dimethylacetamide. At a pot temperature of about 150° C., 54.5 parts of 1,2,4-trichlorobenzene were added. Thereafter the reaction mixture was heated to and maintained at reflux, with agitation, for about eight hours. Water was then added, resulting in the formation of an aqueous layer and an organic layer. The organic layer was separated, washed with water and dried under vacuum to leave a residue which upon fractionation gave 113.3 parts of a light yellow oil, 1,2,4-tris(phenylmercapto)benzene, boiling point 243–248° C. at 0.2 mm.

Example 4

In the manner of Example 3 potassium thiophenolate in dimethylacetamide was prepared from 32.6 parts of 85% potassium hydroxide, 55 parts of thiophenol and 200 ml. of dimethylacetamide. At a pot temperature of about 130° C., 57.6 parts of ar-chloro-ar'-chlorobiphenyl were charged and the reaction mixture was then heated to and maintained at reflux, with agitation, for about twenty-four hours. The solvent was then distilled and water and ether were added to the residue. The resulting organic phase was separated, washed with water and dried to leave a residue, which upon distillation gave 46.3 parts of a light yellow viscous oil, bis(phenylmercapto)biphenyl, boiling point 205–250° C. at 0.25 mm.

The other phenylmercaptobiphenyls of this invention are prepared in the same manner, that is, by reacting a halogenated biphenyl, preferably a chlorinated biphenyl, with an amount of a salt of a thiophenol necessary for reaction with the number of halogen atoms present.

FIVE AROMATIC RINGS

The five ring polyphenyl thioethers can be prepared by reacting an alkali metal salt of a phenylmercaptobenzenethiol with a dihalobenzene in dimethylacetamide or other suitable solvent, as illustrated below.

Example 5

In the manner of Example 4, 59 parts of the potassium salt of m-mercaptophenyl phenyl sulfide were reacted, in dimethylacetamide, with 15.3 parts of m-dichlorobenzene to provide m-bis(m-phenylmercaptophenylmercapto)benzene, an orange liquid, B.P. 300–308° C./0.18 mm.

The unique properties of the all meta-linked polyphenyl thioethers of this invention which make them outstanding materials for use as synthetic lubricants and the like are their wide liquid range, good thermal and oxidation stability, adequate lubricity, good viscosity characteristics, etc., which can best be realized by comparison to other materials which have been suggested for such purposes. Accordingly, the melting point, boiling point and viscosity of the all meta-linked polyphenyl thioethers, other polyphenyl thioethers and phenylmercaptobiphenyls and other materials are given in the tables below.

TABLE I.—PROPERTIES

| Lubricant | Melting point, °F. | Boiling point, °F./mm.Hg | Viscosity; cs. | | | |
|---|---|---|---|---|---|---|
| | | | −40° F. | −20° F. | 100° F. | 210° F. |
| m-Bis(phenylmercapto)benzene | <−40 | 428/0.3 | 35,000 | 8,647 | 12.4 | 3.05 |
| m-Bis(phenylmercaptophenyl)sulfide | Liquid 0° F. | 500/0.5 | | 11,307 | 50.8 | 5.92 |
| m-Bis(m-phenylmercaptophenylmercapto)benzene | 147 | 580/0.18 | | | 270 | 12.5 |
| p-Bis(phenylmercapto)benzene | 82 | | | | | |
| o-Bis(phenylmercapto)benzene | | 185/0.25 | | | 28.25 | 4.03 |
| o-Bis(phenoxy)benzene | 203 | 398/10 | | | | 2.98 |
| m-Bis(phenoxy)benzene | 141 | 325/2.5 | | | 12.4 | 2.62 |
| p-Bis(phenoxy)benzene | 171 | 430/10 | | | Solid | 2.76 |
| m-Bis(phenoxyphenyl)ether | 106 | 467/2.5 | | | 62.0 | 6.00 |
| p-Bis(phenoxyphenyl)ether | 229 | 419/0.5 | | | | Solid |
| m-Bis(m-phenoxyphenoxy)benzene | 109 | 560/25 | | | 337 | 12.7 |
| p-Bis(p-phenoxyphenoxy)benzene | 301 | 609/10 | | | | Solid |
| 1,2,4-tris(phenylmercapto)benzene | | 475/0.2 | | | 217 | 9.40 |
| Bis(phenylmercapro)biphenyl | | 401–482/0.25 | | | | 19.03 |

The oxidation stability of the all meta-linked polyphenyl thioethers can be realized by reference to the table below showing the results obtained by testing various compositions for oxidation stability using a modification of Method 5308.4 "Corrosiveness and Oxidation Stability of Light Oils," contained in Federal Test Method Standard 791, "Lubricants, Liquid Fuels and Related Products." The modification referred to involved increasing the temperature at which the test is run from 347° F. (as specified in said method) to 500° F. Data from the above-mentioned test is reported in terms of percent viscosity increase for oxidation stability, that is, the percent change in viscosity of a test composition relative to the original viscosity.

life of such materials at a selected temperature is greatly extended. The improved polyphenyl ether and phenoxybiphenyl compositions of this invention can be obtained by the addition to the polyphenyl ethers of from about 0.01% by weight to about 10% by weight of polyphenyl thioether, as described above. As evidence of such improvement in oxidative stability, there is presented in the table below data obtained from testing various polyphenyl ether and phenoxybiphenyl compositions for oxidation stability using the modification of Method 5308.4 described above.

OXIDATION STABILITY
[600° F., 48 hours]

| Base Composition | Additive Name | Concentration, weight percent | Percent Viscosity Increase 100° F. | Percent Viscosity Increase 210° F. |
| --- | --- | --- | --- | --- |
| Mixture of five-ring polyphenyl ethers—comprising by weight about 65% m-bis(m-phenoxyphenoxy) benzene; 30% m-[(m-phenoxyphenoxy)(p-phenoxyphenoxy)] benzene; 5% m-bis(p-phenoxyphenoxy)benzene. | None | Control | 83 | 32 |
| | m-Bis(phenylmercapto)benzene | 0.5 | 54 | 21 |
| | do | 1.0 | 45 | 17 |
| | do | 2.0 | 48 | 19 |
| | do | 3.0 | 53 | 20 |
| | p-Bis(phenylmercapto)benzene | 2.0 | 42 | 16 |
| | p-Bis(phenylmercaptophenyl)sulfide | 1.5 | 71 | 25 |
| | m-Bis(phenylmercaptophenyl)sulfide | 1.0 | 25 | 9 |
| | m-Bis(m-phenylmercaptophenylmercapto)benzene | 1.0 | 46 | 16 |
| | 1,2,4-tris(phenylmercapto)benzene | 1.0 | 34.2 | 11.5 |
| | o-Bis(phenylmercapto)benzene | 1.0 | 33.5 | 10.2 |
| | Bis(phenylmercapto)biphenyl | 1.0 | 50.5 | 17.0 |
| Mixture of four-ring polyphenyl ethers | None | Control | 959 | 196 |
| | m-Bis(phenylmercapto)benzene | 1.5 | 13 | 6 |
| m-Bis(m-phenoxyphenoxy)phenyl ether | None | Control | 110 | 35 |
| | m-Bis(phenylmercapto)benzene | 1.5 | 90 | 31 |

TABLE II.—OXIDATION STABILITY
[500° F., 48 hours]

| Lubricant | Percent change in Viscosity 100° F. | Percent change in Viscosity 210° F. |
| --- | --- | --- |
| m-Bis(phenylmercapto)benzene | 83 | 25 |
| Silicone oil | 93 | 63 |
| Silane | 1,060 | 470 |
| Sebacate ester | (¹) | (¹) |
| Highly refined mineral oil | (¹) | (¹) |

¹ Infinite.

The all meta-linked polyphenyl thioethers have good lubricating properties as is evident from the comparison in the table below of the lubricating ability of m-bis(phenylmercapto)benzene and several other types of lubricants. The data was obtained by use of a Shell Four Ball machine using steel-on-steel balls, with a 10 kg. load, a rotational speed of 1200 r.p.m. and temperatures as noted. The duration of the test was two hours in all cases except where seizure occurred.

TABLE III.—LUBRICATING ABILITY

| Lubricant | Scar Diameter, mm. 167° F. | Scar Diameter, mm. 400° F. |
| --- | --- | --- |
| m-Bis(phenylmercapto)benzene | 0.46 | 1.95 |
| Silicone Oil | 3.15 | 4.05 |
| Silane | 3.45 | (¹) |
| Sebacate ester | | 0.7 |
| Highly refined mineral oil | 0.51 | |

¹ Seized.

From the above data it is evident that the all meta-linked polyphenyl thioethers are unique compounds which in addition to possessing a wide liquid range without suffering from the poor viscosity characteristic of the polyphenyl ethers, are oxidatively stable and have good lubricating properties.

As mentioned above the polyphenyl thioethers and poly(phenylmercapto)biphenyls are, in addition to their usefulness as functional fluids, also useful as antioxidants in the polyphenyl ethers and phenoxybiphenyls. Thus, by the incorporation of the polyphenyl thioethers, the useful It has also been found that m-bis(phenylmercapto)benzene, in addition to being useful as a functional fluid is also useful as a pre-emergent herbicide for various grasses, including rye grass and brome grass, a property not possessed, for example, by either p- or o-bis(phenylmercapto)benzene or m-bis(phenoxy)benzene. Additionally, m-bis(phenylmercapto)benzene is useful as an insecticide giving one hundred percent kill of mites by contact application in their mobile, resting and ova stages at a concentration of 0.1%.

It is also contemplated that other additives can be added to the compositions of this invention; such as pour point depressants, crystallization inhibitors or suppressants, viscosity index improvers, dyes, rust inhibitors, other oxidation inhibitors and materials to improve the lubrication properties, especially the extreme pressure properties.

Other modes of applying the principles of this invention will be apparent to those skilled in the art. Accordingly, while this invention has been described by reference to various specific examples and embodiments, it is to be understood that the invention is not limited thereto and that it can be variously practiced within the scope of the following claims.

The embodiments of the invention in which an exclusive property or privilege is claimed are defined as follows:

1. A meta-linked polyphenyl thioether represented by the structure

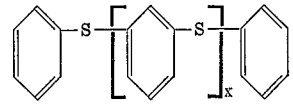

where $x$ is a whole number from 1 to 3.

2. A compound of the formula

wherein $x$ is 2 or 3.

3. m-Bis(phenylmercapto)benzene.
4. Bis(m-phenylmercaptophenyl)sulfide.
5. m-Bis(m-phenylmercaptophenylmercapto)benzene.

(References on following page)

References Cited

UNITED STATES PATENTS

| | | | |
|---|---|---|---|
| 2,538,941 | 1/1951 | Macallum | 260—609 XR |
| 3,098,103 | 7/1963 | Leixschneider | 260—609 XR |
| 2,938,928 | 5/1960 | Stevenson et al. | 260—609 |
| 2,986,582 | 5/1961 | Martin et al. | 260—609 |
| 2,636,862 | 4/1953 | Watson | 252—78 |
| 3,039,968 | 6/1962 | Bruce | 252—78 |

CHARLES B. PARKER, *Primary Examiner.*

D. R. PHILLIPS, *Assistant Examiner.*

U.S. Cl. X.R.

252—45, 48.2, 78, 406